US008423989B2

United States Patent
Fedok et al.

(10) Patent No.: US 8,423,989 B2
(45) Date of Patent: Apr. 16, 2013

(54) SOFTWARE PARAMETER MANAGEMENT

(75) Inventors: Eric Fedok, Catasauqua, PA (US); Jay Colson, Bethlehem, PA (US); Don Deasey, Easton, PA (US)

(73) Assignee: Synchonoss Technologies, Inc., Bridgewater, NJ (US)

( * ) Notice: Subject to any disclaimer, the term of this patent is extended or adjusted under 35 U.S.C. 154(b) by 1005 days.

(21) Appl. No.: 12/114,153

(22) Filed: May 2, 2008

(65) Prior Publication Data

US 2009/0276768 A1 Nov. 5, 2009

(51) Int. Cl.
*G06F 9/44* (2006.01)
(52) U.S. Cl.
USPC .......................................... 717/168
(58) Field of Classification Search .......... 717/101–178; 701/201; 707/600, 607; 711/118–119, 133, 711/158, 220; 709/220, 226
See application file for complete search history.

(56) References Cited

U.S. PATENT DOCUMENTS

| | | | | |
|---|---|---|---|---|
| 6,006,034 A * | 12/1999 | Heath et al. | ................... | 717/170 |
| 6,061,693 A * | 5/2000 | Carney et al. | .......................... | 1/1 |
| 6,487,547 B1 * | 11/2002 | Ellison et al. | ................ | 707/600 |
| 6,615,253 B1 * | 9/2003 | Bowman-Amuah | .......... | 709/219 |
| 6,651,142 B1 * | 11/2003 | Gorelik et al. | ................ | 711/119 |
| 6,901,483 B2 * | 5/2005 | Robinson et al. | ............. | 711/133 |
| 7,305,395 B1 * | 12/2007 | Umamageswaran et al. | ......... | 1/1 |
| 7,457,926 B2 * | 11/2008 | Shen et al. | ..................... | 711/156 |
| 7,519,600 B1 * | 4/2009 | Zenz | ..................................... | 1/1 |
| 7,839,410 B1 * | 11/2010 | Brown et al. | ................... | 345/541 |
| 2002/0133504 A1 * | 9/2002 | Vlahos et al. | .............. | 707/104.1 |
| 2003/0105838 A1 * | 6/2003 | Presley | .......................... | 709/220 |
| 2003/0204525 A1 * | 10/2003 | Toume et al. | ............ | 707/103 R |
| 2004/0205307 A1 * | 10/2004 | Pullen et al. | .................. | 711/158 |
| 2005/0091651 A1 * | 4/2005 | Curtis et al. | .................. | 717/168 |
| 2005/0144267 A1 * | 6/2005 | Maron | ......................... | 709/223 |
| 2005/0268038 A1 * | 12/2005 | Yasue | ........................... | 711/118 |
| 2006/0020689 A1 * | 1/2006 | Roman et al. | ................. | 709/220 |
| 2007/0050548 A1 * | 3/2007 | Bali et al. | ........................ | 711/118 |
| 2007/0140460 A1 * | 6/2007 | Cai et al. | .................. | 379/218.01 |
| 2007/0226715 A1 * | 9/2007 | Kimura et al. | ................. | 717/148 |
| 2008/0027948 A1 * | 1/2008 | Corley et al. | .................... | 707/10 |
| 2008/0147675 A1 * | 6/2008 | Engehausen et al. | ........... | 707/10 |
| 2008/0147974 A1 * | 6/2008 | Madison et al. | .............. | 711/118 |
| 2009/0125228 A1 * | 5/2009 | Dicke et al. | .................... | 701/201 |
| 2009/0182941 A1 * | 7/2009 | Turk | ............................. | 711/118 |

* cited by examiner

*Primary Examiner* — Lewis A Bullock, Jr.
*Assistant Examiner* — Francisco Aponte
(74) *Attorney, Agent, or Firm* — Kaplan Breyer Schwarz & Ottesen, LLP

(57) ABSTRACT

A method and apparatus is disclosed for allowing the updating and overriding of software parameters used by one or more software programs. The parameters are preferably in cache. When the system needs any such parameter, it first checks cache, then a preferably remotely located database, and then, preferably a flat file on the same computer as the cache. The checking is done in the foregoing order, and the parameter is used upon locating a current version of it. If the current version is obtained from anywhere other than the cache, it is put into cache.

14 Claims, 2 Drawing Sheets

SOFTWARE PARAMETER MANAGEMENT

TECHNICAL FIELD

This invention relates to computer software, and more specifically, to an improved method for managing one or more parameters that may be used by one or more software applications.

BACKGROUND OF THE INVENTION

Software applications are ubiquitous in modern business. Such software applications are often designed to be flexible so that business users may customize them to their own particular needs.

Often, the specific customization required varies throughout an organization, and may vary over time even within one organization as the organization uses the software. For example, software may be installed to provide one or more report formats, but a business entity may decide that other formats are needed after some time. Error messages can be fixed at the time of software installation, but as the organization discovers other potential error conditions, the need may arise to be able to easily alter the error conditions. Generally, software applications may require one or more parameters than they need to be altered. The manner, frequency, and specifics of how the software will need to be altered and customized is often unknown at the time of installation.

Many times it is required to take the software application out of service in order to update these parameters. In situations where the parameters are hard coded into the software, this requirement mandates that the application be taken out of service. Moreover, if the software is running on a server with other applications, or is otherwise intertwined with such other applications, they may have to be taken off line also. For mission critical software, this presents a problem for an organization.

Even when parameters used by the software application are not hard coded, if such parameters are placed in a flat file on an application server where the software application is running, the software application may still need to be taken out of service in order to update the parameters.

Adding to the problem is that there is always a need to maximize the speed at which such software applications execute. This is particularly true in a multiuser environment, where many users are accessing a single application server. In such an environment, in order to maximize the speed and thus minimize response time of the software application, it is beneficial to have the needed parameters either hard coded into the software or stored locally on a flat file in the computer's memory. This allows the fastest access to such parameters, and thus, most efficient execution of the software. However, intertwining these parameters so closely with the actual application also operates against the idea of providing flexibility so that such parameters can be altered as needed without taking the system out of service.

Thus, the need to provide flexibility operates against the requirement that the parameters be available as quickly as possible to the software application. Specifically, the more intertwined the parameters needed by the software are with the actual software code (e.g., hard coded), the more difficult it is to alter the parameters without taking down the system, and thus, the less flexible the software system is. Generally however, the less intertwined the parameters are with the software application, the more easily they can be altered as needed.

In view of the foregoing competing requirements, there exists a need in the art to optimize software concurrently both in terms of its flexibility to permit alterations of parameters without taking the system out of service for an extended length of time, and also to provide type intertwining of the parameters needed with the actual software, in order to maximize speed at minimize response time. To date, there exists no known method of properly balancing these requirements.

DETAILED DESCRIPTION OF THE PREFERRED EMBODIMENT

Figure 1:
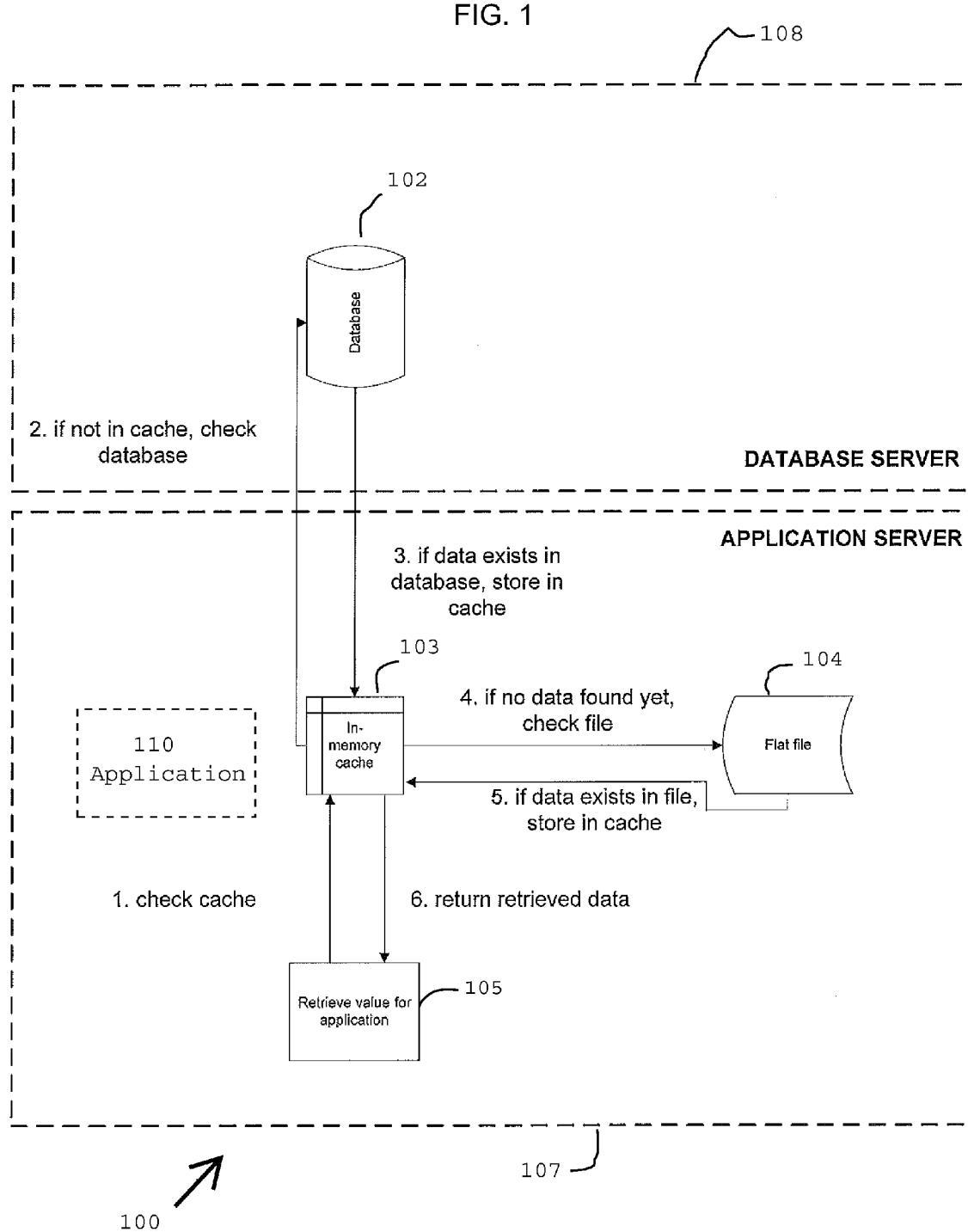
FIG. 1 shows a conceptual diagram of an exemplary embodiment of the present invention, along with an exemplary set of steps for implementing one sample methodology in accordance with the invention.

FIG. 1 depicts a conceptual diagram with an exemplary embodiment of the present invention. The arrangement of FIG. 1 includes a computer system 100 that comprises at least an application server 107 and database server 108. Not shown in FIG. 1 are optional local client PCs or terminals which may connect with the application server to execute one or more applications. It is noted that the arrangement in FIG. 1 also does not show a variety of other computers and terminals that may be connected to the database server 108.

The arrangement of FIG. 1 is exemplary only, and is not intended to limit the nearly infinite variety of computer networks that may be configured to implement the same functionality. Each of the database server and application server may be distributed among plural computers. Moreover, the application and database server may be implemented on the same or different computers.

In operation, an exemplary application represented by block 110 executes on the application server 107. When the application requires a particular parameter, the application first checks cache memory 103 if the parameter is found in cache memory 103, and if the cache is deemed current enough to be useful, the application 110 simply utilizes the parameter from cache.

Whether or not a parameter in cache is deemed current enough may vary by parameter. Specifically, the system designed and typically knows in advance approximately how often the cache memory should be updated with a new value. The value that is to replace the cache value comes from another source, for example, database 102. Thus, if the desired parameter is either not found in cache memory 103, or the application determines that, although the parameter is found in cache memory 103, it has timed out, the next step described below is executed.

If either the parameter has timed out in cache, or if it is not present at all in cache, then an additional source such as database 102 (or other file) is checked for a current version of the necessary parameter. Database 102 is preferably, but not necessarily, a database and is also preferably implemented on a separate database server as shown in FIG. 1. By implementing database 102 on a separate server 108, new data can be populated into the database without taking down the system, and this data will find its way into the cache as a result of the methodology described herein. Moreover, if the database is not operable, the system can simply move to the next step shown in FIG. 1, just the same as if it did not find the data in database 102.

If the required parameter is located in database 102, it is written to cache memory 103 and also utilized by application 110. However, if the parameter is not found in database 102, the flat file 104 is then checked, and the data presumably located. In all events, however, the value of the parameter is retrieved at block 105 and placed into cache memory 103 for subsequent use.

Figure 2:
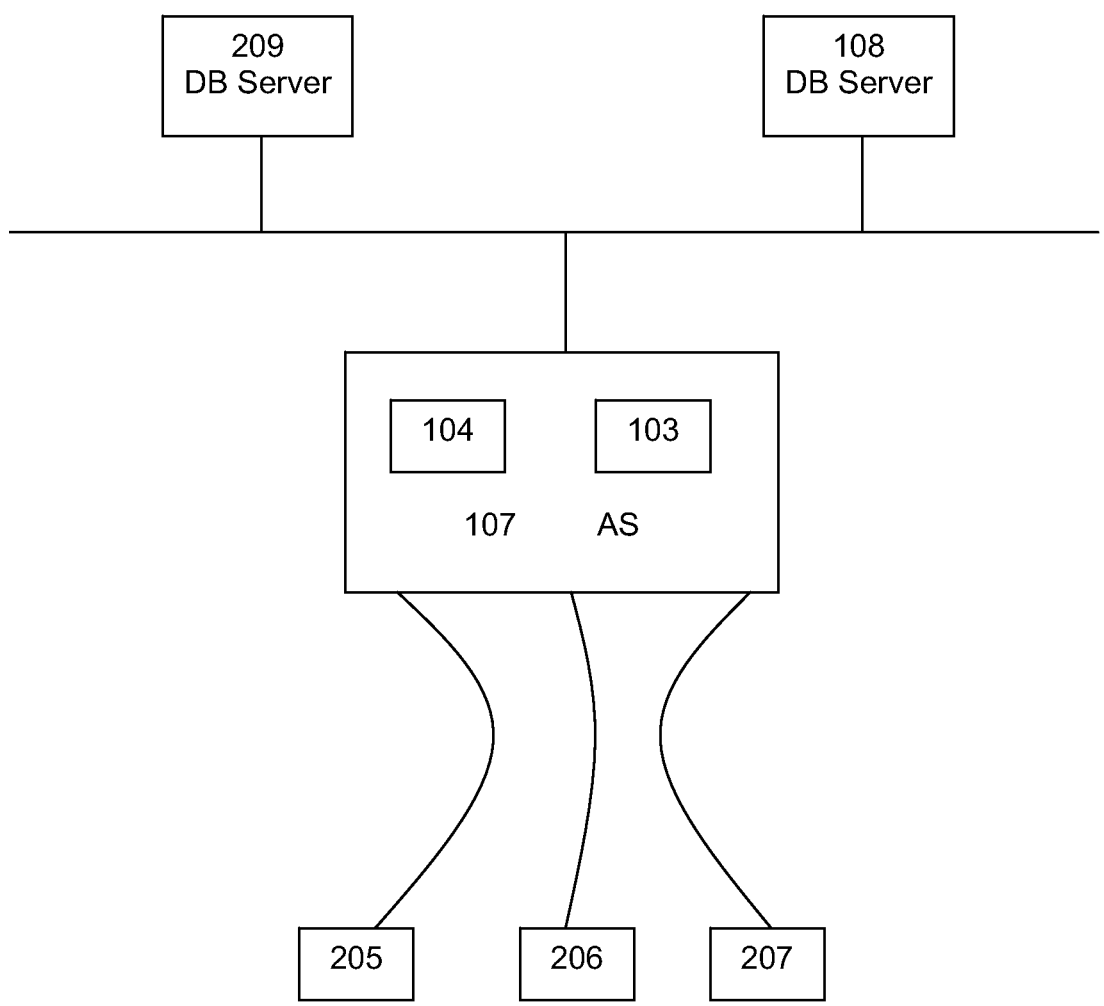
FIG. 2 depicts the components of the present invention in a network environment.

FIG. 2 depicts and additional embodiment of the present invention in which the application server includes plural terminals 205-207, and two database servers 209 and 108. In such a case, a parameter in cache memory may also specify, in the cache, which of the database servers the 209 or 108 to use for the updated parameter. In this manner, if the needed parameter is not in the cache at all, the next step would be to check the database servers 108 and/or 109. These two servers may represent one live and one backup, or, they may represent multiple servers for storing a large amount of data, such that the database is implemented between the two of them.

Alternatively, if the parameter is in cache 103 but has time out, the cache version could include a pointer to the specific database server to check, thereby eliminating the need to check plural servers.

Preferably, the system designer will ascertain in advance which of numerous software parameters change often enough to use the database or other file 102, and which do not change so frequently. Thus, for parameters like passwords, for example, which users tend to maintain long term, the flat file or hard coding can be used. For parameters such as a customer balance in an account, the database server 108 and database 102 can be used as the source of these. Thus, all parameters will gradually be moved into cache as the software application(s) that need them are run on the application server 107, and the cache will by kept up to date using the timeout features described above.

In one embodiment, all parameters that may be used by the software application and which vary are divided into groups in advance of use. Parameters expected to be updated more frequently than the predetermined threshold are placed into the database 102, whereas, parameters expected to be updated less frequently than the predetermined threshold are placed into the flat file. In this manner, once the application(s) are up and running, the parameters gradually migrate into cache, and the ones that need to be updated more frequently than the the threshold can be changed while the software applications using them are "live".

Notably, parameters in the flat file 104 can also be put into the database file 102. Such a situation will arise when a parameter was previously selected for the flat file, but the developer wishes to override the value. Rather than have to take the application out of service to update the flat file, the parameter can just be put into the database 102. Due to the order in which the sources for the parameter are checked, as described above, the system will continue to operate, but the database file will trump the flat file because it is checked first.

The above technique can also be used to allow a parameter in the flat file, and which can thus be accessed very quickly by the software application, to be altered without having to take down a software application using those parameters. Specifically, consider the case where the desired parameter is one that does not vary all that often, so it is placed in flat file 104. If a time comes that such a parameter must be changed, the system can then change it by placing the parameter in database 102, even though it is not normally kept there.

Due to the order in which the software application checks for sources of the parameter (described above), the software application will continue operating, however, it will do so using the new value of the parameter in database 102. Then, if it is desired to permit even faster access by placing the parameter in flat file 104, at least two methodologies can be utilized. First, the flat filed can be updated with the new value at a time when the application is not used, or at least less critical (e.g.; overnight). Alternatively, the software itself can be programmed, and the parameter in database 102 tagged, so that the software itself is instructed to place the new parameter into the flat file after it is first read into cache from the database 102.

The system may also keep track of the number of times a parameter is replaced with information from the database. In this manner, if a parameter was designated by the developer for the flat file, but the system detects that it is changing too often, it can alert the developer to reallocate such parameter to the database file 102.

While the above describes the preferred embodiment of the present invention, various other modifications can be implemented without departing the spirit and scope of the invention.

What is claimed:

1. A method comprising:

executing a software application on an application server, wherein the application software comprises a sequence of steps;

automatically monitoring the frequency of changes made to a set of predetermined parameters needed by the software application, wherein if a first predetermined parameter is updated at a frequency lower than a predetermined frequency threshold, the application server recommends to store said first predetermined parameter in a flat file on said application server, otherwise the application server advises to store said first predetermined parameter in a database of the application server;

in response of the recommendation, overriding, by the developer, the designation of storage of said first predetermined parameter from the flat file, to storage in the database;

when a step in the sequence of steps is executed and requires said first predetermined parameter from said set of predetermined parameters, obtaining said first predetermined parameter by performing the operations of:

checking a cache on said application server for a valid value associated with said first predetermined parameter without taking said software application out of service;

if said valid value of said first predetermined parameter is in said cache, obtaining said first predetermined parameter from said cache, wherein said valid value is deemed present and valid in said cache if said first predetermined parameter is located in cache and if an expiration time associated with said first predetermined parameter has not lapsed;

if said first predetermined parameter is not contained in said cache, checking said database on a database server for said first predetermined parameter without taking said software application out of service, wherein the application server and the database server are different servers;

if said first predetermined parameter exists in said database, moving said first predetermined parameter from the database into said cache on said application server; and if said first predetermined parameter does not exist in said database, obtaining said first predetermined parameter from said flat file on said application server, and moving said first predetermined parameter from said flat file into said cache; and using said first predetermined parameter in said step regardless of where said first predetermined parameter was obtained wherein updated values of the predetermined parameter are used in lieu of the original values.

2. The method of claim 1, wherein the expiration time associated with said first predetermined parameter is different from the expiration time associated with at least one other of said predetermined parameters.

3. A method comprising:

executing a software application on an application server, wherein the application software comprises a sequence of steps;

automatically monitoring the frequency of changes made to a set of predetermined parameters needed by the software application, wherein if a first predetermined parameter is updated at a frequency lower than a predetermined frequency threshold, the application server recommends to store said first predetermined parameter in a flat file on said application server, otherwise the application server advises to store said first predetermined parameter in a database of the application server;

storing said first predetermined parameter in said flat file of said application server based on said recommendation; creating an update value for said first predetermined parameter of said set of predetermined parameters; storing said update value for said first predetermined parameter in said database of the application server;

when a step in the sequence of steps is executed and requires said first predetermined parameter from said set of predetermined parameters, obtaining said first predetermined parameter by performing the operations of:

checking a cache on said application server for a valid value associated with said first predetermined parameter without taking said software application out of service;

if said valid value of said first predetermined parameter is in said cache, obtaining said first predetermined parameter from said cache, wherein said valid value is deemed present and valid in said cache if said first predetermined parameter is located in cache and if an expiration time associated with said first predetermined parameter has not lapsed;

if said first predetermined parameter is not contained in said cache, checking said database on a database server for said first predetermined parameter without taking said software application out of service, wherein the application server and the database server are different servers;

if said first predetermined parameter exists in said database, moving said first predetermined parameter from the database into said cache on said application server; and if said first predetermined parameter does not exist in said database, obtaining said first predetermined parameter from said flat file on said application server, and moving said first predetermined parameter from said flat file into said cache; and using said first predetermined parameter in said step regardless of where said first predetermined parameter was obtained; wherein updated values of the predetermined parameter are used in lieu of the original values.

4. The method of claim 3, further comprising:

identifying one or more parameters configured for storage on said flat file and stored on said flat file that are being updated at a frequency that exceeds an expected update frequency level; and relocating said identified parameters from said flat file to said remote file in said database server.

5. A method comprising:

executing a software application on an application server, wherein the application software comprises a sequence of steps;

automatically monitoring the frequency of changes made to a set of predetermined parameters needed by the software application, wherein if a first predetermined parameter is updated at a frequency lower than a predetermined frequency threshold, the application server recommends to store said first predetermined parameter in a third memory source on said application server, otherwise the application server advises to store said first predetermined parameter in a second memory source of the application server;

in response of the recommendation, overriding, by the developer, the designation of storage of said first predetermined parameter from the third memory source, to storage in the second memory source;

when a step in the sequence of steps is executed and requires said first predetermined parameter from said set of predetermined parameters, obtaining said first predetermined parameter by performing the operations of:

checking a first memory source on said application server for a valid value associated with said first predetermined parameter without taking said software application out of service;

if said valid value of said first predetermined parameter is in said first memory source, obtaining said first predetermined parameter from said first memory source, wherein said valid value is deemed present and valid in said cache if said first predetermined parameter is located in first memory source and if an expiration time associated with said first predetermined parameter has not lapsed;

if said first predetermined parameter is not contained in said first memory source, checking said second memory source on a database server for said first predetermined parameter without taking said software application out of service, wherein the application server and the second memory source are different servers;

if said first predetermined parameter exists in said second memory source, moving said first predetermined parameter from the second memory source into said first memory source on said application server; and if said first predetermined parameter does not exist in said second memory source, obtaining said first predetermined parameter from said third memory source on said application server, and moving said first predetermined parameter from said third memory source into said first memory source; and using said first predetermined parameter in said step regardless of where said first predetermined parameter was obtained; wherein updated values of the predetermined parameter are used in lieu of the original values.

6. The method of claim 5, wherein the expiration time associated with said first predetermined parameter is different from the expiration time associated with at least one other of said predetermined parameters.

7. A method comprising:

executing a software application on an application server, wherein the application software comprises a sequence of steps;

automatically monitoring the frequency of changes made to a set of predetermined parameters needed by the software application, wherein if a first predetermined parameter is updated at a frequency lower than a predetermined frequency threshold, the application server recommends to store said first predetermined parameter in a third memory source on said application server, otherwise the application server advises to store said first predetermined parameter in a second memory source of the application server;

storing said first predetermined parameter in said third memory source of said application server based on said recommendation;

creating an update value for said first predetermined parameter of said set of predetermined parameters; storing said update value for said first predetermined parameter in said second memory source of the application server;

when a step in the sequence of steps is executed and requires said first predetermined parameter from said set of predetermined parameters, obtaining said first predetermined parameter by performing the operations of:
  checking a first memory source on said application server for a valid value associated with said first predetermined parameter without taking said software application out of service;
  if said valid value of said first predetermined parameter is in said first memory source, obtaining said first predetermined parameter from said first memory source, wherein said valid value is deemed present and valid in said cache if said first predetermined parameter is located in first memory source and if an expiration time associated with said first predetermined parameter has not lapsed;
  if said first predetermined parameter is not contained in said first memory source, checking said second memory source on a database server for said first predetermined parameter without taking said software application out of service, wherein the application server and the second memory source are different servers;
  if said first predetermined parameter exists in said second memory source, moving said first predetermined parameter from the second memory source into said first memory source on said application server; and
  if said first predetermined parameter does not exist in said second memory source, obtaining said first predetermined parameter from said third memory source on said application server, and moving said first predetermined parameter from said third memory source into said first memory source; and using said first predetermined parameter in said step regardless of where said first predetermined parameter was obtained; wherein updated values of the predetermined parameter are used in lieu of the original values.

8. The method of claim 7, further comprising:
identifying one or more parameters configured for storage on said flat file and stored on said flat file that are being updated at a frequency that exceeds an expected update frequency level; and relocating said identified parameters from said flat file to said remote file in said database server.

9. A system comprising a processor executing instructions to perform the functions of:
automatically monitoring the frequency of changes made to a set of predetermined parameters needed by the software application, wherein if a first predetermined parameter is updated at a frequency lower than a predetermined frequency threshold, the application server recommends to store said first predetermined parameter in a flat file on said application server, otherwise the application server advises to store said first predetermined parameter in a database of the application server;

in response of the recommendation, overriding, by the developer, the designation of storage of said first predetermined parameter from the flat file, to storage in the database;

when a step in the sequence of steps is executed and requires said first predetermined parameter from said set of predetermined parameters, obtaining said first predetermined parameter by performing the operations of:
  checking a cache on said application server for a valid value associated with said first predetermined parameter without taking said software application out of service;
  if said valid value of said first predetermined parameter is in said cache, obtaining said first predetermined parameter from said cache, wherein said valid value is deemed present and valid in said cache if said first predetermined parameter is located in cache and if an expiration time associated with said first predetermined parameter has not lapsed;
  if said first predetermined parameter is not contained in said cache, checking said database on a database server for said first predetermined parameter without taking said software application out of service, wherein the application server and the database server are different servers;
  if said first predetermined parameter exists in said database, moving said first predetermined parameter from the database into said cache on said application server; and
  if said first predetermined parameter does not exist in said database, obtaining said first predetermined parameter from said flat file on said application server, and moving said first predetermined parameter from said flat file into said cache; and using said first predetermined parameter in said step regardless of where said first predetermined parameter was obtained; wherein updated values of the predetermined parameter are used in lieu of the original values.

10. The system of claim 9, wherein the expiration time associated with said first predetermined parameter is different from the expiration time associated with at least one other of said predetermined parameters.

11. A system comprising a processor executing instructions to perform the functions of:
automatically monitoring the frequency of changes made to a set of predetermined parameters needed by the software application, wherein if a first predetermined parameter is updated at a frequency lower than a predetermined frequency threshold, the application server recommends to store said first predetermined parameter in a flat file on said application server, otherwise the application server advises to store said first predetermined parameter in a database of the application server;

storing said first predetermined parameter in said flat file of said application server based on said recommendation;

creating an update value for said first predetermined parameter of said set of predetermined parameters; storing said update value for said first predetermined parameter in said database of the application server;

when a step in the sequence of steps is executed and requires said first predetermined parameter from said set of predetermined parameters, obtaining said first predetermined parameter by performing the operations of:
  checking a cache on said application server for a valid value associated with said first predetermined parameter without taking said software application out of service;
  if said valid value of said first predetermined parameter is in said cache, obtaining said first predetermined parameter from said cache, wherein said valid value is deemed present and valid in said cache if said first predetermined parameter is located in cache and if an expiration time associated with said first predetermined parameter has not lapsed;
  if said first predetermined parameter is not contained in said cache, checking said database on a database server for said first predetermined parameter without taking said software application out of service, wherein the application server and the database server are different servers;
  if said first predetermined parameter exists in said database, moving said first predetermined parameter from the database into said cache on said application server; and
  if said first predetermined parameter does not exist in said database, obtaining said first predetermined parameter from said flat file on said application server, and moving said first predetermined parameter from said flat file into said cache; and
using said first predetermined parameter in said step regardless of where said first predetermined parameter was obtained; wherein updated values of the predetermined parameter are used in lieu of the original values.

12. The system of claim 11, further comprising:
identifying one or more parameters configured for storage on said flat file and stored on said flat file that are being updated at a frequency that exceeds an expected update frequency level; and relocating said identified parameters from said flat file to said remote file in said database server.

13. A system comprising a processor executing instructions to perform the functions of:
  automatically monitoring the frequency of changes made to a set of predetermined parameters needed by the software application, wherein if a first predetermined parameter is updated at a frequency lower than a predetermined frequency threshold, the application server recommends to store said first predetermined parameter in a third memory source on said application server, otherwise the application server advises to store said first predetermined parameter in a second memory source of the application server;
  in response of the recommendation, overriding, by the developer, the designation of storage of said first predetermined parameter from the third memory source, to storage in the second memory source;
  when a step in the sequence of steps is executed and requires said first predetermined parameter from said set of predetermined parameters, obtaining said first predetermined parameter by performing the operations of:
    checking a first memory source on said application server for a valid value associated with said first predetermined parameter without taking said software application out of service;
    if said valid value of said first predetermined parameter is in said first memory source, obtaining said first predetermined parameter from said first memory source, wherein said valid value is deemed present and valid in said cache if said first predetermined parameter is located in first memory source and if an expiration time associated with said first predetermined parameter has not lapsed;
    if said first predetermined parameter is not contained in said first memory source, checking said second memory source on a database server for said first predetermined parameter without taking said software application out of service, wherein the application server and the second memory source are different servers;
    if said first predetermined parameter exists in said second memory source, moving said first predetermined parameter from the second memory source into said first memory source on said application server; and
    if said first predetermined parameter does not exist in said second memory source, obtaining said first predetermined parameter from a said third memory source on said application server, and moving said first predetermined parameter from said third memory source into said first memory source; and
  using said first predetermined parameter in said step regardless of where said first predetermined parameter was obtained; wherein updated values of the predetermined parameter are used in lieu of the original values.

14. The system of claim 13, wherein the expiration time associated with said first predetermined parameter is different from the expiration time associated with at least one other of said predetermined parameters.

\* \* \* \* \*

UNITED STATES PATENT AND TRADEMARK OFFICE
CERTIFICATE OF CORRECTION

PATENT NO. : 8,423,989 B2  
APPLICATION NO. : 12/114153  
DATED : April 16, 2013  
INVENTOR(S) : Eric Fodok, Jay Colson and Don Deasey Page 1 of 1

It is certified that error appears in the above-identified patent and that said Letters Patent is hereby corrected as shown below:

On the Title page of the patent, to the right of identification item (73) (the assignee), the word "Synchonoss" should be changed to -- Synchronoss --.

Signed and Sealed this
Twenty-fourth Day of September, 2013

Teresa Stanek Rea
*Deputy Director of the United States Patent and Trademark Office*